J. E. MARCEAU.
STEERING GEAR.
APPLICATION FILED JUNE 19, 1918.
1,305,297.
Patented June 3, 1919.
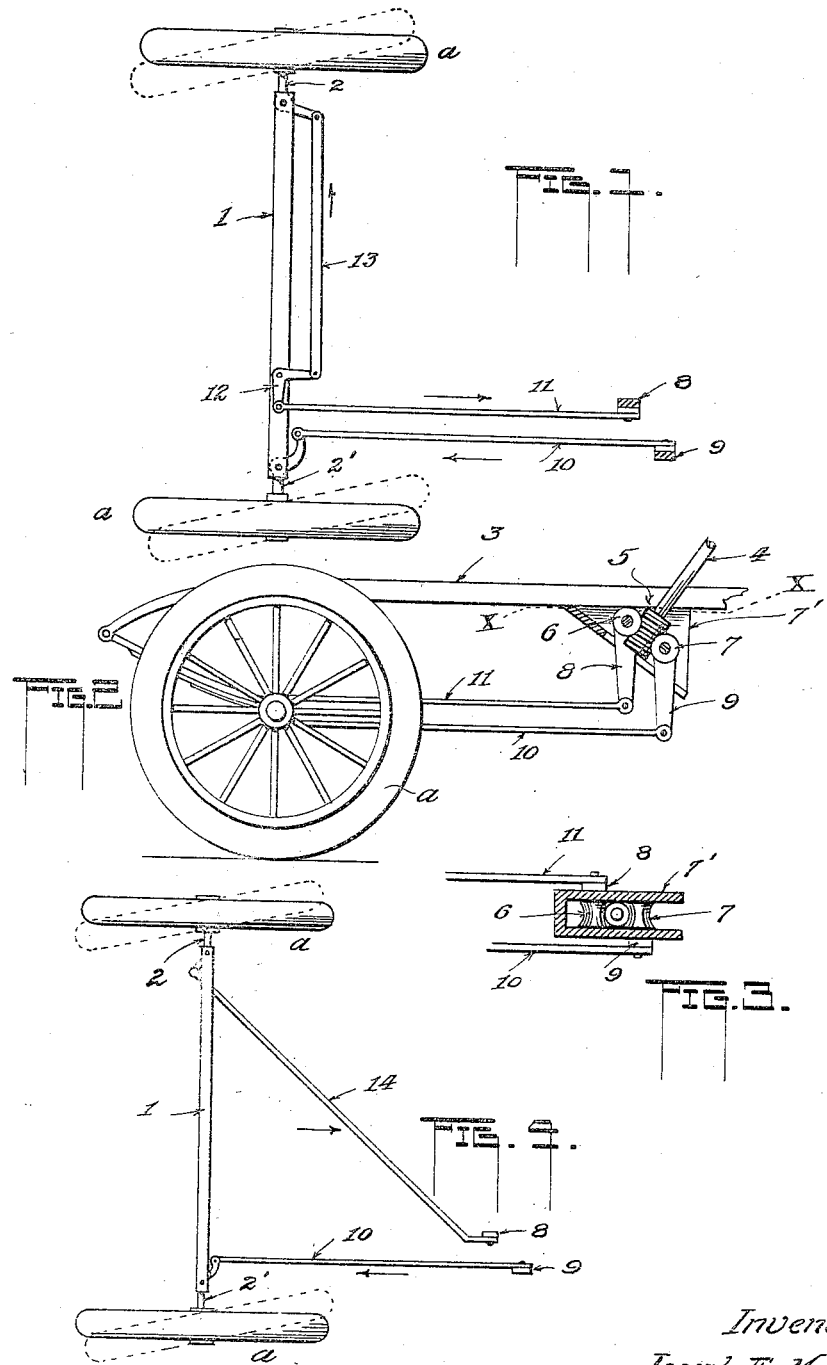
Inventor:
Joseph E. Marceau
By L. M. Hurlbut
Atty.

UNITED STATES PATENT OFFICE.

JOSEPH E. MARCEAU, OF FAIRBURY, ILLINOIS.

STEERING-GEAR.

1,305,297.  Specification of Letters Patent.  Patented June 3, 1919.

Application filed June 19, 1918. Serial No. 240,821.

*To all whom it may concern:*

Be it known that I, JOSEPH E. MARCEAU, citizen of the United States, residing at Fairbury, in the county of Livingston and State of Illinois, have invented certain new and useful Improvements in Steering-Gears; and do hereby declare that the following is a full, clear, and exact description of the invention, which will enable others skilled in the art to which it appertains to make and use the same.

This invention relates to a steering gear for horseless vehicles and particularly to a steering gear structure wherein safety to the occupants of the vehicle is of the first importance.

The main object of the invention is the provision of a structure in a steering gear for vehicles which will prevent the steering ground-wheels being swung out of their course when meeting road obstacles and which will also remove all chance of the steering hand-wheel being jerked out of the hands of the driver.

Another object is to prevent lateral swinging movement of the steering road-wheels when either of them strikes an obstruction, locking each to the steering post.

Another object is the provision of a structure in a steering gear wherein the steering road-wheels are independent of one another, there being no direct connection between them through their steering arms, the movement imparted to them by the hand steering-wheel and steering column being transmitted independently to each by independent conections through an irreversible gearing.

In the appended drawing forming a part of this application,

Figure 1 shows a portion of the front running gear of a horseless vehicle showing my steering apparatus, except as to the steering post or column.

Fig. 2 is a side elevation of a portion of the vehicle, the steering gear and steering post or column.

Fig. 3 is a plan of part of the gearing on line *x—x*, Fig. 2.

Fig. 4 is a plan of a modified form of the structures shown in Fig. 1.

In order to better understand my invention and the benefits derived therefrom mention is first to be made concerning the present day forms of steering gear, wherein the steering road-wheels are invariably cross-connected by one or more tie rods extending between and pivoted to the steering knuckles, the structure being of such a nature that whenever one of the wheels meets an obstacle it is quite often turned aside, and through the connecting tie-rod moving the other wheel aside throwing both out of their proper courses, besides taking the steering wheel from the hands of the operator. Whenever one wheel is thus moved, the steering post is turned because of the single connection of the whole gear therewith.

Particularly in driving cars of light weight at speeds higher than twenty or twenty-five miles an hour considerable care is required to hold the steering gear steady so that the car will not be thrown from the road, it being well known that the higher the speed of travel the greater the danger. In heavier cars this is not so much the case since the erratic movement of the gearing is not so noticeable.

Again, in driving a vehicle over roads several inches deep in heavy mud the vehicle is very difficult to manage, which is also true when following deep ruts.

I have found by extended practice that if the steering road-wheels have no connection but are independent of one another and separately controlled by the steering post or column, the influence of one being offset by the other through said column, the road-wheels cannot transmit motion to the steering column nor to each other so that even in driving over obstacles or against such obstructions as railway rails and street-car tracks even at an angle, the wheels are held and mount and pass over the same without swerving out of their courses and without transmitting motion to the steering column, and that in traveling over heavy roads or following dry ruts the vehicle is under absolutely perfect control. When running at high speed with the lightest type of car the same safety is experienced, there being absolutely no swerving tendency as experienced with the older forms of steering gears referred to.

In the drawings and specification letters and figures of references correspond, it being understood that the device is susceptible of various changes.

1 is indicative of the front axle of a horseless vehicle, and 2, 2′ are the steering knuckles mounted thereon adapted to pivot on vertical axes in a manner well known, and carried by the wheels *a*. 3, Fig. 2, is indicative of a part of the frame of the vehicle and 4 the steering column provided in the present instance with a worm 5. 6 and 7 are worm-wheels in mesh with the worm at opposite sides and carried in a suitable housing 7′, see Fig. 3, each said worm-wheel having an arm, 8 and 9 respectively, secured relatively thereto.

10 is a rod connecting the arm 9 with the knuckle 2′ and 11 is a similar rod connected at one end to the arm 8 and at its other end to one arm of a bell-crank 12 pivoted upon the axle 1, for example, there being a link 13 connecting the other arm of the bell crank with the knuckle 2.

Fig. 4 shows a modified structure wherein the figures of reference mentioned correspond except as to a member indicated at 14 which replaces the rod 11, the bell crank 12 and the link 13. The member 14 is connected directly between the arm 8 and the knuckle 2′. The turning of the steering column in either direction transmits motion to the worm-wheels in either direction, thereby pulling upon one of the rods and pushing upon the other.

In Fig. 1 the darts indicate the opposite directions of movement of these rods, it being observed that by pushing on the rod 10 the wheel corresponding thereto will be moved in the direction of the dotted lines, while by pulling on the opposite rod the opposite wheel will be moved to the dotted line position of that wheel, this action resulting through the bell crank 12 and the link 13, it being observed that both wheels are necessarily turned in the same direction. The pitch of the threads of the worm is such that a movement of the steering column will impart to the ground-wheels a given desired movement aided by the leverages of the other parts, which pitch is also such that the worm-wheels cannot turn said worm and thus the rods cannot be moved by road obstacles and since the worm-wheels are opposed to one another in their direction of movement, even if the pitch of the threads were socalled "quick" ones, there can be no movement of the steering rod due to such thrusts since the worm-wheels will prevent it. A lock is thus produced through the worm and worm wheels. There can be no action except through the manual operation of the steering column.

If such a structure as that shown in Fig. 4 were employed the same locking action would result at the steering post.

My structure thus provides an effective holding of the road-wheels in any position that they may be set. I have found in practice that even on rough roads the wheels may be set in any desired position and will pass over obstacles without deviating from such position, while the operator's hands are free of the steering wheel.

The type of gearing between the steering post and the arms 8, 9 may be varied from that shown and described since it is my purpose to employ any form which will act as a positive lock to the road-wheels and the mechanism throughout may be changed so long as the objects sought are attained.

Having thus described my invention, I claim:—

1. In combination with an axle, a pair of ground wheels including their knuckles mounted independently of one another, a steering column including a worm, and a worm-wheel at substantially diametrically opposite sides of the worm in engagement with it, each worm wheel including an arm, of a separate element operatively connecting each of the arms with one of said knuckles, said knuckles being otherwise free and independent of one another.

2. In combination with an axle, a pair of ground wheels including their knuckles mounted independently of one another, a steering column including a worm, and a worm-wheel at substantially diametrically opposite sides of the worm in engagement with it, each worm wheel including an arm, of a bell crank mounted on the axle, a rod connecting one arm thereof with one of the knuckles, a rod connecting the other arm thereof with one of the worm-wheel arms, and a rod connecting the other worm-wheel arm with the other knuckle, all being arranged whereby a movement of the steering column will swing both the ground wheels in the same direction.

In testimony whereof I affix my signature in presence of two witnesses.

JOSEPH E. MARCEAU.

Witnesses:
ELLA L. GRIEDER,
ROBERT HENNING.